United States Patent
Gu et al.

(10) Patent No.: US 10,375,114 B1
(45) Date of Patent: Aug. 6, 2019

(54) SYSTEMS AND METHODS FOR ENFORCING ACCESS-CONTROL POLICIES

(71) Applicant: Symantec Corporation, Mountain View, CA (US)

(72) Inventors: Lei Gu, Bedford, MA (US); Ilya Sokolov, Boston, MA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 119 days.

(21) Appl. No.: 15/194,403

(22) Filed: Jun. 27, 2016

(51) Int. Cl.
*H04L 29/06* (2006.01)
*G06F 21/60* (2013.01)
*G06F 21/62* (2013.01)

(52) U.S. Cl.
CPC ............ *H04L 63/20* (2013.01); *G06F 21/604* (2013.01); *G06F 21/62* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 3,740,718 A | 6/1973 | Melvin, Jr. | |
| 3,744,043 A | 7/1973 | Walden et al. | |
| 5,867,578 A | 2/1999 | Brickell et al. | |
| 6,100,811 A | 8/2000 | Hsu | |
| 6,970,183 B1 | 11/2005 | Monroe | |
| 7,657,097 B2 | 2/2010 | Silic | |
| 7,925,751 B1 | 4/2011 | Bolinger et al. | |
| 8,261,976 B1 * | 9/2012 | Block | G06Q 20/18 235/379 |
| 8,316,421 B2 | 11/2012 | Etchegoyen | |
| 8,620,841 B1 | 12/2013 | Filson | |
| 8,719,590 B1 | 5/2014 | Faibish et al. | |
| 8,726,405 B1 | 5/2014 | Bailey | |

(Continued)

FOREIGN PATENT DOCUMENTS

| | | |
|---|---|---|
| AU | 2013371346 B2 | 3/2017 |
| CA | 2 895 265 C | 2/2018 |

(Continued)

OTHER PUBLICATIONS

Fake GPS Location app, https://play.google.com/store/apps/details?id=com.lexa.fakegps&hl=en, as accessed Feb. 23, 2017, Lexa Tools.

(Continued)

*Primary Examiner* — Andrew J Steinle
(74) *Attorney, Agent, or Firm* — FisherBroyles, LLP

(57) ABSTRACT

The disclosed computer-implemented method for enforcing access-control policies may include (i) determining that a user is attempting to access a controlled device that is subject to an access-control policy, (ii) locating at least one additional device that is in physical proximity to the controlled device, (iii) acquiring context information from the additional device that provides information about the identity of the user, (iv) establishing the identity of the user based on the context information acquired from the additional device, and (v) enforcing the access-control policy based on the identity of the user. Various other methods, systems, and computer-readable media are also disclosed.

18 Claims, 7 Drawing Sheets

(56) References Cited

U.S. PATENT DOCUMENTS

| | | |
|---|---|---|
| 8,925,037 B2 | 12/2014 | Marino et al. |
| 9,154,466 B2 | 10/2015 | Sobel et al. |
| 9,171,178 B1 | 10/2015 | Banerjee |
| 9,202,173 B1 | 12/2015 | Dotan et al. |
| 9,218,468 B1 | 12/2015 | Rappaport |
| 9,282,435 B2 | 3/2016 | Ward et al. |
| 9,396,599 B1 | 7/2016 | Malhotra |
| 9,479,250 B2 | 10/2016 | Mitchell |
| 9,661,483 B2 | 5/2017 | Bastianelli |
| 9,697,660 B1 | 7/2017 | Sokolov et al. |
| 9,817,958 B1 | 11/2017 | McCorkendale |
| 10,116,513 B1 | 10/2018 | Sundaram |
| 2002/0059532 A1 | 5/2002 | Ata et al. |
| 2002/0080938 A1 | 6/2002 | Alexander, III et al. |
| 2003/0172280 A1 | 9/2003 | Scheidt |
| 2003/0216143 A1 | 11/2003 | Roese |
| 2004/0143556 A1 | 7/2004 | Graubart et al. |
| 2004/0153671 A1 | 8/2004 | Schuyler et al. |
| 2005/0097320 A1 | 5/2005 | Golan et al. |
| 2006/0031682 A1 | 2/2006 | Sakai et al. |
| 2006/0082439 A1 | 4/2006 | Bazakos et al. |
| 2006/0164282 A1 | 7/2006 | Duff et al. |
| 2006/0210167 A1 | 9/2006 | Inoue |
| 2007/0171921 A1 | 7/2007 | Wookey |
| 2007/0210910 A1 | 9/2007 | Norstrom et al. |
| 2008/0018458 A1 | 1/2008 | Derrick et al. |
| 2009/0043445 A1 | 2/2009 | Bishop et al. |
| 2009/0198112 A1 | 8/2009 | Park et al. |
| 2010/0005526 A1 | 1/2010 | Tsuji |
| 2010/0014721 A1 | 1/2010 | Steinberg |
| 2010/0024042 A1 | 1/2010 | Motahari |
| 2010/0083385 A1 | 4/2010 | Uchida |
| 2010/0205667 A1 | 8/2010 | Anderson |
| 2010/0281254 A1 | 11/2010 | Carro |
| 2010/0299002 A1 | 11/2010 | Abdallah et al. |
| 2010/0302143 A1 | 12/2010 | Spivack |
| 2010/0325712 A1 | 12/2010 | Kakuta et al. |
| 2011/0206285 A1 | 8/2011 | Hodge |
| 2011/0219423 A1 | 9/2011 | Aad et al. |
| 2011/0219427 A1 | 9/2011 | Hito |
| 2011/0247069 A1 | 10/2011 | Slater |
| 2011/0252131 A1 | 10/2011 | Karaoguz |
| 2011/0293095 A1 | 12/2011 | Ben Ayed |
| 2011/0321137 A1 | 12/2011 | Iida |
| 2011/0321143 A1 | 12/2011 | Angaluri et al. |
| 2012/0011559 A1 | 1/2012 | Miettinen et al. |
| 2012/0044089 A1 | 2/2012 | Yarnold |
| 2012/0072719 A1 | 3/2012 | Hui et al. |
| 2012/0079576 A1 | 3/2012 | Han et al. |
| 2012/0139755 A1 | 6/2012 | Ginsberg |
| 2012/0181333 A1 | 7/2012 | Krawczewicz |
| 2012/0185910 A1 | 7/2012 | Miettinen |
| 2012/0190386 A1 | 7/2012 | Anderson |
| 2012/0198570 A1 | 8/2012 | Joa |
| 2012/0239929 A1 | 9/2012 | Newman |
| 2012/0243687 A1 | 9/2012 | Li |
| 2012/0246739 A1 | 9/2012 | Mebed |
| 2012/0331527 A1 | 12/2012 | Walters et al. |
| 2013/0010966 A1 | 1/2013 | Li |
| 2013/0097709 A1 | 4/2013 | Basavapatna |
| 2013/0102283 A1 | 4/2013 | Lau |
| 2013/0103482 A1 | 4/2013 | Song |
| 2013/0104203 A1 | 4/2013 | Davis |
| 2013/0151617 A1* | 6/2013 | Davis .................. H04L 67/02 709/204 |
| 2013/0159876 A1 | 6/2013 | Narasimhan et al. |
| 2013/0177157 A1 | 7/2013 | Li |
| 2013/0197998 A1 | 8/2013 | Buhrmann et al. |
| 2013/0227712 A1 | 8/2013 | Salem |
| 2013/0262873 A1 | 10/2013 | Read et al. |
| 2013/0275498 A1 | 10/2013 | Cheng et al. |
| 2013/0290201 A1 | 10/2013 | Rodriguez Carrillo |
| 2013/0298248 A1 | 11/2013 | Boldrev |
| 2013/0318580 A1 | 11/2013 | Gudlavenkatasiva et al. |
| 2013/0318625 A1 | 11/2013 | Fan |
| 2013/0340089 A1 | 12/2013 | Steinberg |
| 2014/0007225 A1 | 1/2014 | Gay |
| 2014/0025485 A1 | 1/2014 | Niemeijer |
| 2014/0040137 A1 | 2/2014 | Carlson |
| 2014/0067679 A1* | 3/2014 | O'Reilly .................. G06F 21/32 705/44 |
| 2014/0068702 A1 | 3/2014 | Hyndman |
| 2014/0082715 A1 | 3/2014 | Grajek |
| 2014/0112537 A1 | 4/2014 | Frank et al. |
| 2014/0123255 A1 | 5/2014 | Etchegoyen |
| 2014/0130127 A1 | 5/2014 | Toole |
| 2014/0173700 A1 | 6/2014 | Awan |
| 2014/0189786 A1 | 7/2014 | Castro |
| 2014/0201377 A1 | 7/2014 | Kadishay et al. |
| 2014/0282870 A1 | 9/2014 | Markwordt et al. |
| 2014/0380444 A1 | 12/2014 | Kelley |
| 2015/0019873 A1 | 1/2015 | Hagemann |
| 2015/0069219 A1 | 3/2015 | Klein et al. |
| 2015/0082399 A1 | 3/2015 | Wu |
| 2015/0089231 A1 | 3/2015 | Oxford |
| 2015/0237038 A1 | 8/2015 | Grajek et al. |
| 2015/0288687 A1 | 10/2015 | Heshmati et al. |
| 2015/0324559 A1 | 11/2015 | Boss |
| 2015/0349883 A1 | 12/2015 | Mitchell |
| 2015/0363986 A1 | 12/2015 | Hoyos |
| 2016/0007083 A1* | 1/2016 | Gurha .............. H04N 21/44222 725/13 |
| 2016/0012655 A1* | 1/2016 | Hanson .............. G07C 9/00039 340/5.54 |
| 2016/0044001 A1 | 2/2016 | Pogorelik |
| 2016/0057110 A1 | 2/2016 | Li |
| 2016/0063640 A1 | 3/2016 | Ellingsworth |
| 2016/0068264 A1* | 3/2016 | Ganesh .................. G08G 5/0069 701/2 |
| 2016/0082926 A1 | 3/2016 | Mouser et al. |
| 2016/0087950 A1 | 3/2016 | Barbir |
| 2016/0112522 A1 | 4/2016 | Abello |
| 2016/0112871 A1 | 4/2016 | White |
| 2016/0132684 A1 | 5/2016 | Barbas |
| 2016/0140257 A1 | 5/2016 | Vega |
| 2016/0164922 A1 | 6/2016 | Boss |
| 2016/0165650 A1 | 6/2016 | Kim |
| 2016/0165651 A1 | 6/2016 | Pathuri et al. |
| 2016/0212109 A1 | 7/2016 | Hird |
| 2016/0241390 A1 | 8/2016 | Harris |
| 2016/0316449 A1 | 10/2016 | Pitt |
| 2016/0358441 A1 | 12/2016 | Mittleman |
| 2017/0053280 A1 | 2/2017 | Lishok et al. |
| 2017/0083345 A1 | 3/2017 | Sol |
| 2017/0163666 A1 | 6/2017 | Venkatramani |
| 2017/0195429 A1 | 7/2017 | Bokare et al. |
| 2017/0255940 A1* | 9/2017 | Kohli .................. G06Q 20/346 |
| 2018/0027517 A9 | 1/2018 | Noonan |
| 2018/0103021 A1 | 4/2018 | Arunkumar |
| 2018/0211464 A1 | 7/2018 | Kusens |
| 2018/0212976 A1 | 7/2018 | Arunkumar |
| 2018/0249398 A1 | 8/2018 | Hillary |

FOREIGN PATENT DOCUMENTS

| | | |
|---|---|---|
| CN | 101950332 A | 1/2011 |
| CN | 202795383 U | 3/2013 |
| CN | 103354931 A | 10/2013 |
| CN | 105874464 B | 1/2019 |
| EP | 1 703 431 A2 | 9/2006 |
| EP | 2 941 733 A1 | 11/2015 |
| EP | 3 087 531 A1 | 11/2016 |
| EP | 3166086 A1 | 5/2017 |
| JP | 2006259930 A | 9/2006 |
| JP | 2007293062 A | 11/2007 |
| JP | 2007304834 A | 11/2007 |
| JP | 2009086891 A | 4/2009 |
| JP | 2009140051 A | 6/2009 |
| JP | 20090140051 A | 6/2009 |
| JP | 2010128778 A | 5/2010 |
| JP | 20100128778 A | 6/2010 |
| JP | 2011004214 A | 1/2011 |
| JP | 2011134137 A | 7/2011 |

(56) References Cited

FOREIGN PATENT DOCUMENTS

| | | | |
|---|---|---|---|
| JP | 20120235424 A | 11/2012 | |
| JP | 2012248027 A | 12/2012 | |
| JP | 20130246465 A | 12/2013 | |
| JP | 2014086865 A | 5/2014 | |
| JP | 2016-503208 A | 2/2016 | |
| JP | 6205062 B2 | 9/2017 | |
| JP | 6314267 B2 | 4/2018 | |
| WO | WO 2012/162009 A1 | 11/2012 | |
| WO | 2013101215 A1 | 7/2013 | |
| WO | 2014/107435 A1 | 7/2014 | |
| WO | 2015/100192 A1 | 7/2015 | |

OTHER PUBLICATIONS

How SUPL Reveals My Identity and Location to Google When I Use GPS, http://mobilesociety.typepad.com/mobile_life/2014/08/supl-reveals-my-identity-and-location-to-google.html, published Aug. 31, 2014, Mobilesociety.
Assisted GPS, https://en.wikipedia.org/wiki/Assisted_GPS, as accessed Feb. 24, 2017, Wikipedia.
HomeNews—WiFi can be used to count people with or without electronic gadgets; https://www.rt.com/news/266188-wifi-signal-human-density/; as accessed on Jun. 21, 2016; Jun. 10, 2015.
Ali et al.; Keystroke Recognition Using WiFi Signals; https://www.sigmobile.org/mobicom/2015/papers/p90-aliA.pdf; Sep. 7, 2015.
iRobot's Roomba 980 Maps Your Home via Camera and Takes Smartphone Commands; http://blogs.wsj.com/personal-technology/2015/09/16/irobots-roomba-980-maps-your-home-via-camera-and-takes-smartphone-commands/; as accessed on Jun. 21, 2016; Sep. 16, 2015.
Microsoft Hololens; https://www.microsoft.com/microsoft-hololens/en-us; as accessed on Jun. 21, 2016.
Bruce McCorkendale, et al; Systems and Methods for Constructing a Volumetric Model of a Space from a Constellation of Sensing Devices; U.S. Appl. No. 14/833,655, filed Aug. 24, 2015.
Daniel Marino, et al; Systems and Methods for Enforcing Data-Loss-Prevention Policies Using Mobile Sensors; U.S. Appl. No. 13/733,131, filed Jan. 2, 2013.
Devicelock; Preventing Devastating Data Leaks by Securing the Endpoints of Your Network; http://www.devicelock.com/products/, as accessed on Sep. 10, 2012.
Konstantinos Kotis et al.; An ontology for the automated deployment of applications in heterogeneous IoT environments; http://www.semantic-web-journal.net/sites/default/files/swj247_0.pdf, as accessed Jun. 25, 2015; Semantic Web Journal; Feb. 13, 2012.
OMA Device Management; http://openmobilealliance.org/about-oma/work-program/device-management/, as accessed Jun. 25, 2015; Jan. 15, 2013.
Open Mobile Alliance (OMA); http://openmobilealliance.org/, as accessed Jun. 25, 2015; Aug. 2, 2002.
openHAB; http://www.openhab.org/, as accessed Jun. 25, 2015; Jul. 11, 2011.
Daniel Siewiorek; SenSay: A Context-Aware Mobile Phone; Human Computer Interaction and Institute for Complex Engineered Systems; As accessed on Sep. 10, 2012.
Megan Treacy; 10 environmental sensors that go along with you; http://www.treehugger.com/clean-technology/environmental-sensors.html, as accessed Jun. 25, 2015; Mar. 5, 2013.
Zenprise; Mobile DLP (Data Leakage Prevention); http://www.zenprise.com/solutions/mobile-data-leakage-prevention/, as accessed on Sep. 10, 2012.
Alastair R. Beresford et al., MockDroid: trading privacy application functionality on smartphones; Proceedings of the 12th Workshop on Mobile Computing Systems and Applications, HotMobile '11, Phoenix, Arizona, Mar. 1-3, 2011.
Jason Franklin et al.; Passive Data Link Layer 802.11 Wireless Device Driver Fingerprinting; Proceedings of USENIX Security '06, Jul. 31-Aug. 4, 2006, Vancouver, BC, Canada.
School of Privacy, Guide on How to be Safe, Secure and Protect Your Online Anonymity; Fake GPS Location—Android; http://school-of-privacy.com/post/70381068300/fake-gps-location-andoid; Dec. 18, 2013.
SensorSimulator; https://code.google.com/p/openintents/wiki/SensorSimulator; Jan. 12, 2013.
William E. Sobel, et al.; Systems and Methods for Introducing Variation in Sub-System Output Signals to Prevent Device Fingerprinting; U.S. Appl. No. 14/139,824, filed Dec. 23, 2013.
C. Rigney et al; Remote Authentication Dial in User Service (RADIUS); https://tools.ietf.org/html/rfc2865, as accessed Nov. 6, 2015; Request for Comments: 2865; Jun. 2000.
C. Neuman et al; The Kerberos Network Authentication Service (V5); https://tools.ietf.org/html/rfc4120, as accessed Nov. 6, 2015; Request for Comments: 4120; Jul. 2005.
Kerberos: The Network Authentication Protocol; http://web.mit.edu/kerberos/, as accessed Nov. 6, 2016; Jan. 28, 1999.
Microsoft Negotiate; https://msdn.microsoft.com/en-us/library/windows/desktop/aa378748(v=vs.85).aspx. as accessed Nov. 6, 2015; Nov. 13, 2011.
Microsoft NTLM; https://msdn.microsoft.com/en-us/library/windows/desktop/aa378749(v=vs.85).aspx, as accessed Nov. 6, 2015; Nov. 12, 2011.
Prasad Bokare, et al; Systems and Methods for Facilitating Single Sign-On for Multiple Devices; U.S. Appl. No. 15/041,040, filed Feb. 11, 2016.
Symantec Identity Access Manager; https://www.symantec.com/identity-access-manager/, as accessed Nov. 6, 2015; Symantec Corporation; Nov. 7, 2014.
Symantec Validation and ID Protection Service; http://www.symantec.com/vip-authentication-service/, as accessed Nov. 6, 2015; Symantec Corporation; Feb. 10, 2014.
Ramakrishnan Meenakshi Sundaram; Systems and Methods for Managing Smart Building Systems; U.S. Appl. No. 15/041,002, filed Feb. 10, 2016.
ZigBee Alliance, http://www.zigbee.org/, as accessed Dec. 14, 2015, (Nov. 14, 2001).
Z-Wave, http://www.z-wave.com/, as accessed Dec. 14, 2015, (Dec. 23, 2002).
OMA Device Management Working Group, http://openmobilealliance.org/about-oma/work-program/device-management/, as accessed Dec. 14, 2015, (Jan. 15, 2013).
Lei Gu, et al; Systems and Methods for Enforcing Access-Control Policies in an Arbitrary Physical Space; U.S. Appl. No. 15/195,677, filed Jun. 28, 2016.
Bruce McCorkendale; Systems and Methods for Authenticating Users; U.S. Appl. No. 14/834,949, filed Aug. 25, 2015.
Home—Good Security Questions; http://goodsecurityquestions.com/, as accessed Jun. 25, 2015, (Dec. 27, 2007).
Kevin Jiang, et al; Systems and Methods for Using Vehicles as Information Sources for Knowledge-Based Authentication; U.S. Appl. No. 14/979,620, filed Dec. 28, 2015.
Snapshot; https://www.progressive.com/auto/snapshot/, as accessed Nov. 18, 2015; Progressive Casualty Insurance Company; On or before Nov. 18, 2015.
FasTrak; https://www.bayareafastrak.org/en/howitworks/gettingstarted.shtml, as accessed Nov. 18, 2015; On or before Nov. 18, 2015.
Ilya Sokolov, et al; Systems and Methods for Verifying User Attributes; U.S. Appl. No. 14/985,675, filed Dec. 31, 2015.
E-ZPass, https://www.e-zpassny.com/en/home/index.shtml, as accessed Nov. 18, 2015, (On or before Nov. 18, 2015).
FastPass, https://disneyland.disney.go.com/guest-services/fastpass/, as accessed Nov. 18, 2015, Disney, (On or before Nov. 18, 2015).
Toll Payment Options at the Golden Gate Bridge, http://www.goldengate.org/tolls/tollpaymentoptions.php, as accessed Nov. 18, 2015, (On or before Nov. 18, 2015).
OnStar, https://www.onstar.com/us/en/home.html, as accessed Nov. 18, 2015, (On or before Nov. 18, 2015).
BMW Assist, http://www.bmwusa.com/Standard/Content/Explore/BMWValue/BMWAssist/default.aspx, as accessed Nov. 18, 2015, (On or before Nov. 18, 2015).
Department of Motor Vehicles, https://www.dmv.ca.gov/portal/dmv, as accessed Nov. 18, 2015, (On or before Nov. 18, 2015).

(56) References Cited

OTHER PUBLICATIONS

Ilya Sokolov, et al; Systems and Methods for Evaluating Identity Intensity; U.S. Appl. No. 15/057,618, filed Mar. 1, 2016.
Evgenios Kornaropoulos, et al; Systems and Methods for Securely Detecting Data Similarities; U.S. Appl. No. 14/871,868, filed Sep. 30, 2015.
Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).
Ilya Sokolov et al; Systems and Methods for Certifying Geolocation Coordinates of Computing Devices; U.S. Appl. No. 15/466,156, filed Mar. 22, 2017.
Ilya Sokolov et al.; Systems and Methods for Securely Sharing Cloud-Service Credentials Within a Network of Computing Devices; U.S. Appl. No. 15/276,105, filed Sep. 26, 2016.
Amazon Echo, Nov. 6, 2014: https://en.wikipedia.org/wiki/Amazon_Echo.
Google Home, announced May 18, 2016: https://en.wikipedia.org/wiki/Google_Home.
Secret sharing, as accessed on Sep. 13, 2016: https://en.wikipedia.org/wiki/Secret_sharing.
Norton Identity Safe, announced Aug. 28, 2007: https://identitysafe.norton.com/.
Abadi et al, Traffic Flow Predicition for Road Transporation Networks with Limited Traffic Data, IEEE, vol. 16, No. 2, Apr. 2015, pp. 653-662.
Baek et al, An Authentication Framework for Automatic Dependent Survelliance-Broadcast Based on Online/Offline Identity-Based Signature, IEEE, 2013, pp. 358-363.
Michael Buhrmann, et al.; Mobile Wallet Security; U.S. Appl. No. 61/591,232, filed Jan. 26, 2012.
Malek Ben Salem, et al.; Adaptive Risk-Based Access Controls; U.S. Appl. No. 61/602,427, filed Feb. 23, 2012.
Temple, James, "Accelerometer IDs smartphones in seconds", SFGATE, URL: http://www.sfgate.com/technology/dotcommentary/article/accelerometer-IDs-smartphone-in-seconds-4885711.php, Oct. 10, 2013, 6 pages.
International Search Report and Written Opinion received for International Patent Application Serial No. PCT/US2013/078319 dated Apr. 16, 2014, 7 pages.
International Search Report and Written Opinion received for International Patent Application Serial No. PCT/US2014/071791 dated Mar. 19, 2015, 8 pages.

\* cited by examiner

SYSTEMS AND METHODS FOR ENFORCING ACCESS-CONTROL POLICIES

BACKGROUND

Individuals and organizations frequently seek to control how others access services under their control. For example, a parent may wish to enforce parental controls on televisions and smart phones in their household in order to control their child's access to various digital media. Similarly, an organization may wish to limit websites that its employees can access during work hours. In some cases, an individual or organization may use different access-control policies for certain people. For example, a parent can input a passcode to bypass parental controls so that they can watch movies that would otherwise be blocked. As an additional example, a project manager may have access to files and/or servers that other employees may be restricted from accessing.

Unfortunately, traditional access-control techniques suffer from a number of drawbacks. Some devices may be unable to execute access-control software. In other cases, an administrator may be unable or unwilling to install endpoint security software on certain devices. Even worse, clever users may be able to circumvent access-control software by uninstalling software, killing processes, spoofing their identity, or otherwise tampering with the access-control software. Furthermore, controls on shared machines may be unable to enforce proper policies if they are unable to properly identify the user that is accessing the content. Accordingly, the instant disclosure identifies and addresses a need for improved systems and methods for enforcing access-control policies.

SUMMARY

As will be described in greater detail below, the instant disclosure describes various systems and methods for enforcing access-control policies by monitoring the space around controlled devices using a constellation of additional devices. These additional devices may perform a variety of monitoring functions, such as observing content displayed by the controlled device and/or determining the identity of a user that is attempting to access the controlled device. By determining the identity of the user through additional devices, the systems and methods described herein may allow for an access-control system to enforce proper access-control policies appropriate to the user accessing the content, regardless of the controlled device's ability to execute access-control software and/or tampering efforts on the part of the user. Furthermore, such access control may grant users proper access to certain content, even in the absence of an administrator and/or parent.

In one example, a computer-implemented method for enforcing access-control policies may include (i) determining that a user is attempting to access a controlled device that is subject to an access-control policy, (ii) locating at least one additional device that is in physical proximity to the controlled device, (iii) acquiring context information from the additional device that provides information about the identity of the user, (iv) establishing the identity of the user based on the context information acquired from the additional device, and (v) enforcing the access-control policy based on the identity of the user.

The computer-implemented method may include acquiring a variety of context information. For example, acquiring the context information may include acquiring (i) a photograph of the user, (ii) a video of the user, (iii) a recording of the user's voice, (iv) a series of keystrokes entered by the user on the controlled device, and/or (v) a Wi-Fi signal interference pattern of the user.

The additional device may take a variety of forms. For example, the additional device may include a self-propelled device that is capable of relocating itself in physical space.

In some embodiments, establishing the identity of the user may include determining an approximate age of the user. In some examples, establishing the identity of the user may include matching the context information to a previously established user profile. In some examples, enforcing the access-control policy may include enforcing an access-control policy that is associated with the previously established user profile.

Additionally, the computer-implemented method may include monitoring the controlled device. For example, the computer-implemented method may include recognizing content that the user is attempting to access via the controlled device. For example, recognizing the content may include observing a display of the controlled device via the additional device.

The computer-implemented method may include identifying a device responsible for managing the controlled device. For example, the computer-implemented method may include identifying a command-and-control device that monitors a group of controlled devices that includes the controlled device and enforces access-control policies for the controlled devices.

In some examples, enforcing the access-control policy may include performing a security action based on determining the identity of the user and/or identifying content displayed by the controlled device. The security action may include performing a variety of actions, such as (i) notifying a supervisor of the controlled device that the user attempted to access the controlled device, (ii) generating a log entry that describes the user's attempt to access the controlled device, (iii) restricting at least one function of the controlled device, and/or (iv) disabling the controlled device.

In one embodiment, a system for implementing the above-described method may include (i) a determination module, stored in memory, that determines that a user is attempting to access a controlled device that is subject to an access-control policy, (ii) a locating module, stored in memory, that locates at least one additional device that is in physical proximity to the controlled device, (iii) an acquiring module, stored in memory, that acquires context information from the additional device that provides information about the identity of the user, (iv) an establishing module, stored in memory, that establishes the identity of the user based on the context information acquired from the additional device, (v) an enforcing module, stored in memory, that enforces the access-control policy based on the identity of the user, and (vi) at least one physical processor configured to execute the determination module, the locating module, the acquiring module, the establishing module, and the enforcing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine that a user is attempting to access a controlled device that is subject to an access-control policy, (ii) locate at least one additional device that is in physical proximity to the controlled device, (iii) acquire context information from the additional device that provides information about the identity of the user, (iv) establish the identity of the user based on the context information acquired from the additional device, and (v) enforce the access-control policy based on the identity of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
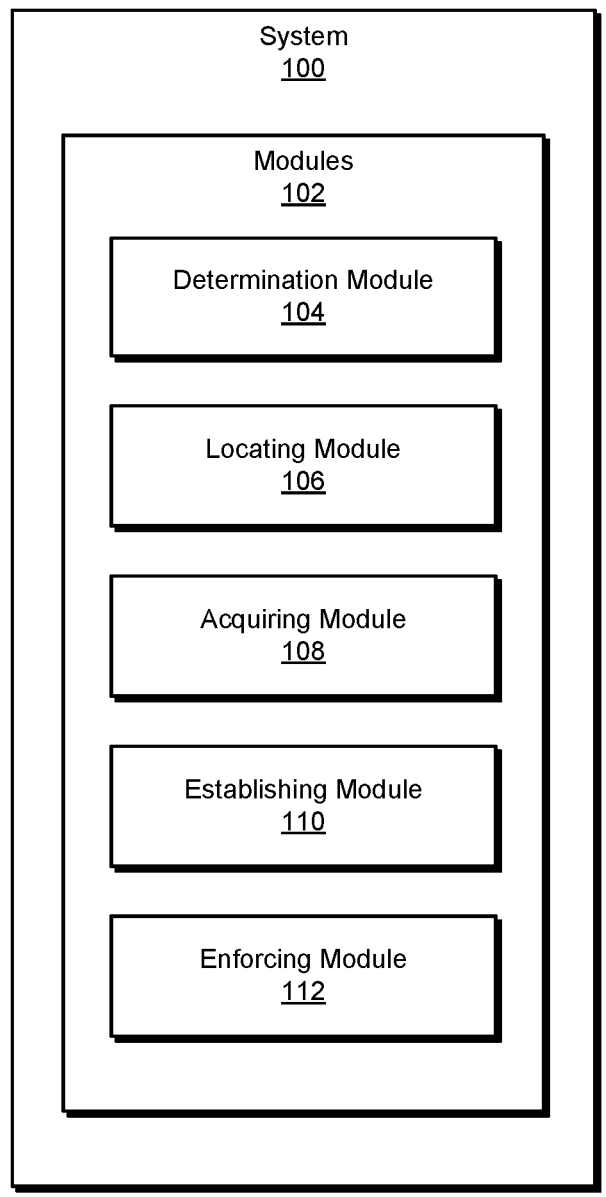
FIG. 1 is a block diagram of an example system for enforcing access-control policies.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EMBODIMENTS

The present disclosure is generally directed to systems and methods for enforcing access-control policies. As will be explained in greater detail below, the systems and methods described herein may allow an access-control system to appropriately enforce content controls based on the identity of a user. The systems and methods described herein may enable such access control even if the controlled device is unable to identify users and/or enforce access-control policies on its own.

Figure 2:
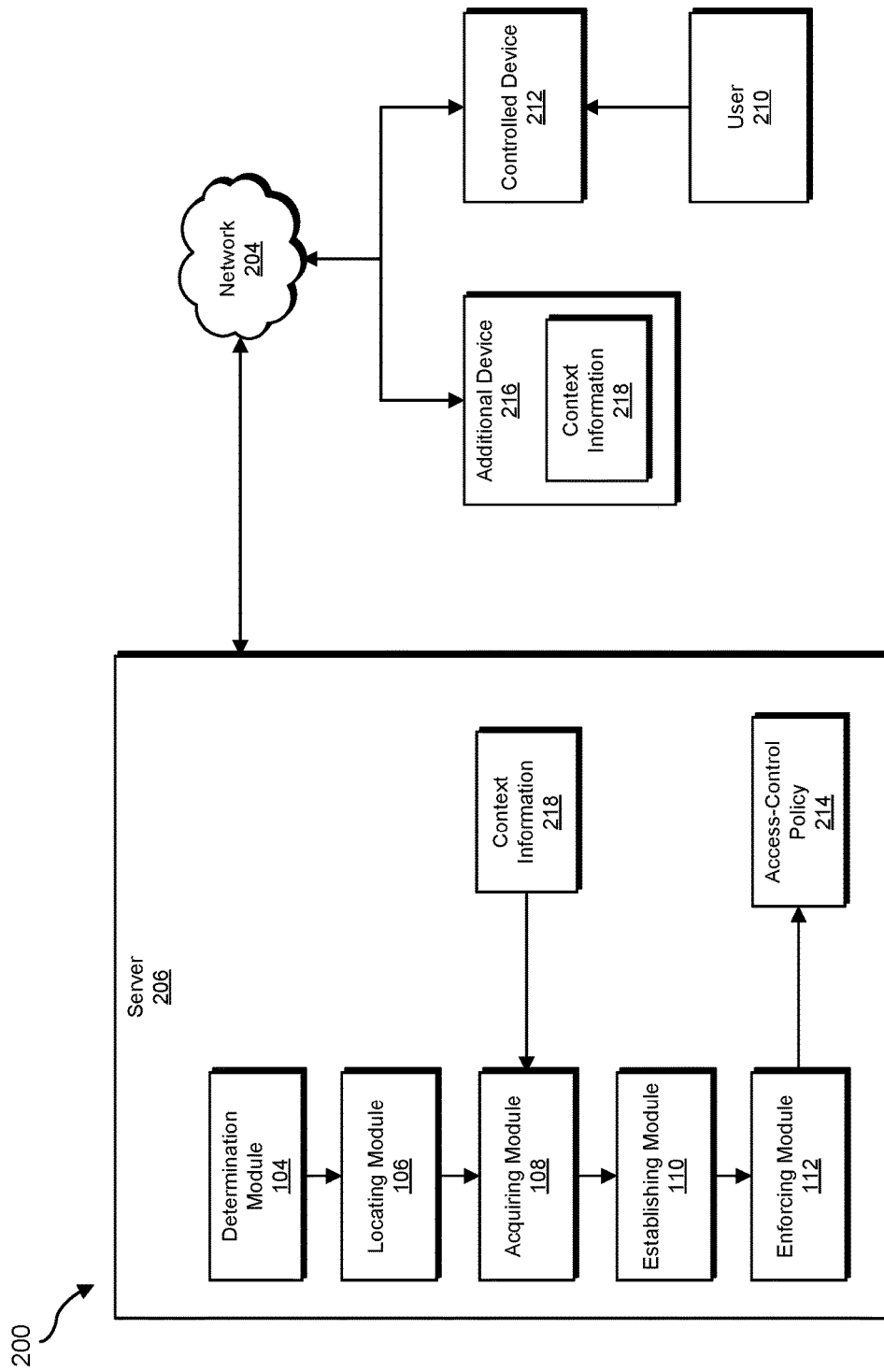
FIG. 2 is a block diagram of an additional example system for enforcing access-control policies.

The following will provide, with reference to FIGS. 1-2, detailed descriptions of example systems for enforcing access-control policies. Detailed descriptions of corresponding computer-implemented methods will also be provided in connection with FIG. 3. Detailed descriptions of additional example systems for enforcing access-control policies will be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of example system 100 for enforcing access-control policies. As illustrated in this figure, system 100 may include one or more modules 102 for performing one or more tasks. For example, and as will be explained in greater detail below, system 100 may include a determination module 104 that determines that a user is attempting to access a controlled device that is subject to an access-control policy. System 100 may additionally include a locating module 106 that locates at least one additional device in physical proximity to the controlled device. System 100 may also include an acquiring module 108 that acquires context information from the additional device that provides information about the identity of the user. System 100 may additionally include an establishing module 110 that establishes the identity of the user based on the context information acquired from the additional device; an. System 100 may also include an enforcing module 112 that enforces the access-control policy based on the identity of the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., server 206), computing system 610 in FIG. 6, and/or portions of network architecture 700 in FIG. 7. One or more of modules 102 in FIG. 1 may also represent all or portions of one or more special-purpose computers configured to perform one or more tasks.

System 100 in FIG. 1 may be implemented in a variety of ways. For example, all or a portion of system 100 may represent portions of example system 200 in FIG. 2. As shown in FIG. 2, system 200 may include a server 206 in communication with an additional device 216 and/or a controlled device 212 via a network 204. In one example, server 206 may be programmed with one or more of modules 102. Additionally or alternatively, additional device 216, controlled device 212, and/or C&C device 404 in FIG. 4 may be programmed with one or more of modules 102.

In one embodiment, one or more of modules 102 from FIG. 1 may, when executed by at least one processor of server 206, enable server 206 to enforce access-control policies based on the observed identity of a user. For example, and as will be described in greater detail below, determination module 104 may determine that a user 210 is attempting to access a controlled device 212 that is subject to an access-control policy 214. Locating module 106 may then locate at least one additional device 216 that is in physical proximity to controlled device 212. Acquiring module 108 may then acquire context information 218 from additional device 216 that provides information about the identity of user 210. Establishing module 110 may then establish the identity of user 210 based on context information 218 acquired from additional device 216. Finally, enforcing module 112 may enforce access-control policy 214 based on the identity of user 210.

Server 206 generally represents any type or form of computing device that is capable of receiving and analyzing context information from other systems, such as additional device 216 in FIG. 2. Examples of server 206 include, without limitation, application servers and database servers configured to provide various database services and/or run certain software applications. In some examples, server 206 may include a command-and-control device (e.g., C&C device 404 in FIG. 4) that monitors and enforces access-control policies for a collection of controlled devices. Such a command-and-control device may enforce the access-control policies through auxiliary devices that are connected to and/or or control a power supply of a controlled device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network architecture 700 in FIG. 7, or the like. Network 204 may facilitate communication or data transfer using wireless or wired connections. In one embodiment, network 204 may facilitate communication between server 206 and additional device 216.

Controlled device 212 generally represents any device that is subject to an access-control policy. In some examples, controlled device 212 may be subjected to the access-control policy through software installed on controlled device 212. Additionally or alternatively, controlled device 212 may be connected to an auxiliary device that allows another device to enforce access-control policies on controlled device 212. For example, controlled device 212 may be connected to a smart power source that may turn off power to controlled device 212 at the direction of a command-and-control server that enforces the access-control policy. In some embodiments, controlled device 212 may not be installed with access-control software. In such embodiments, control over controlled device 212 may come exclusively through control over other devices connected to controlled device 212, such as a router and/or a power source. Some examples of controlled device 212 include, without limitation, personal computers, mobile phones, televisions, network routers and/or gateways, smart watches, and/or any other device that a parent and/or administrator may wish to control.

As mentioned above, controlled devices may be subject to access-control policies. The term "access-control policy," as used herein, generally refers to any rule or set of rules that describes circumstances under which users are or are not allowed to access certain functions of a controlled device. Access-control policies may restrict access to content based on a variety of factors, such as the identity of the user, the time at which the user attempts to access the content, the location from where the user attempts to access the content, the nature of the content being accessed, or any other suitable metric that may be used to determine whether or not a particular user should have access to certain content and/or functionalities of a device. As a specific example, a parent may enable parental controls on a smart phone to prevent a child from making in-application purchases without parental approval. As an additional example, a corporation may enact access-control policies to prevent guests to a building from inappropriately accessing internal networks.

Additional device 216 generally represents any device or combination of devices that is capable of capturing information about its surroundings and providing that information to another device. Additional device 216 may include a variety of components capable of capturing information about a user, such as a camera, microphone, infrared sensor, wireless antenna, or any other suitable component capable of capturing information that may be used to identify a user. Examples of additional device 216 include, without limitation, laptops, smart phones, smart watches, smart TVs, tablet computers, security cameras, and/or any other device that is capable of capturing information about a user.

Figure 3:
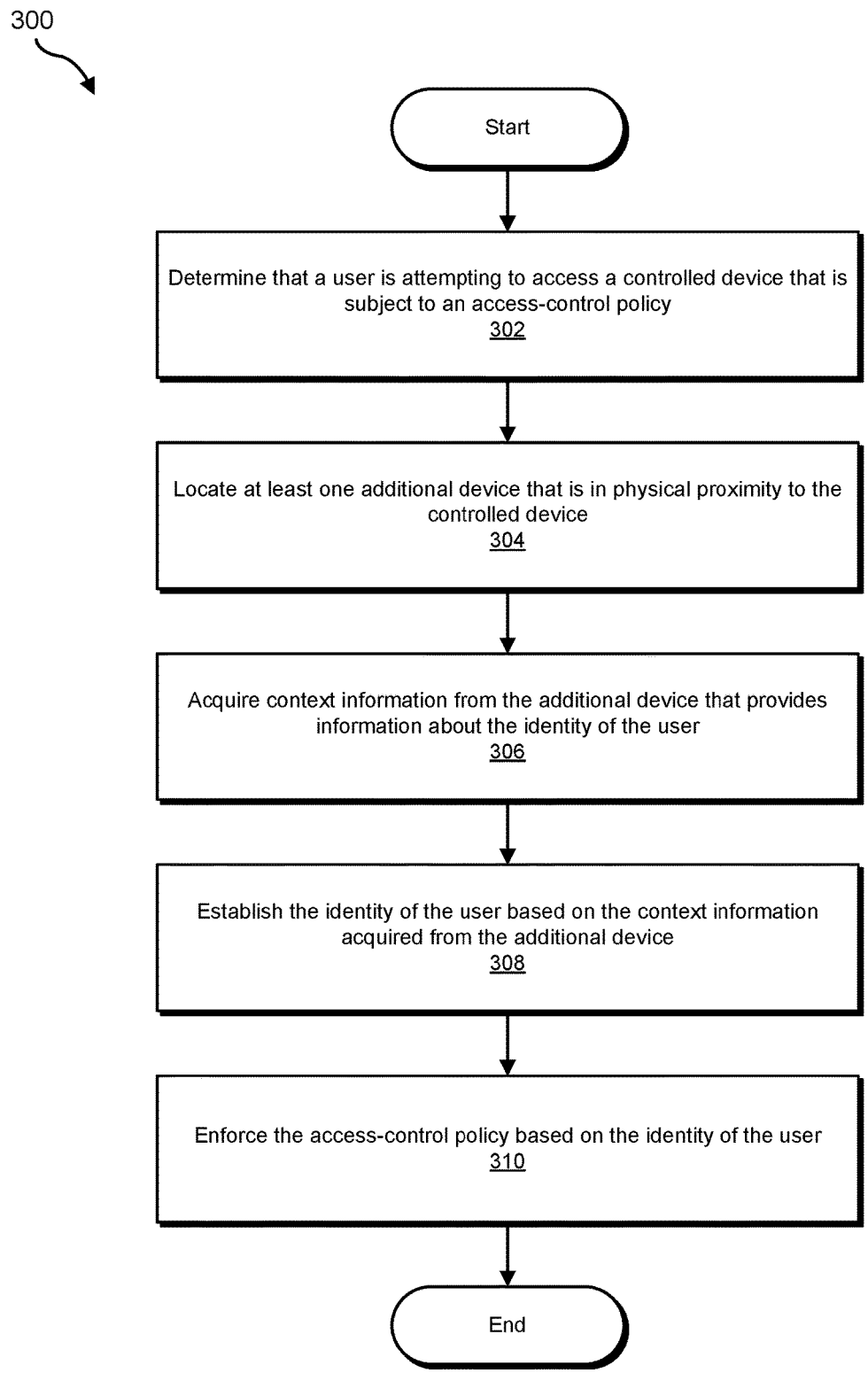
FIG. 3 is a flow diagram of an example method for enforcing access-control policies.

FIG. 3 is a flow diagram of an example computer-implemented method 300 for enforcing access-control policies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of network architecture 700 in FIG. 7.

As illustrated in FIG. 3, at step 302, one or more of the systems described herein may determine that a user is attempting to access a controlled device that is subject to an access-control policy. For example, determination module 104 may, as part of server 206 in FIG. 2, determine that user 210 is attempting to access controlled device 212 that is subject to access-control policy 214.

Determination module 104 may determine that a user is attempting to access controlled device 212 in a variety of contexts. In some examples, controlled device 212 may be installed with software that enforces access-control policies. Such software may detect that a user is attempting to access a particular function of controlled device 212. In further examples, controlled device 212 may be connected to an auxiliary device, such as a smart power plug and/or a router, that detects when a user attempts to access certain features of controlled device 212. Additionally or alternatively, controlled device 212 and/or an auxiliary device connected to controlled device 212 may report to a command-and-control device and provide an event notification to the command-and-control device that a user is attempting to access a particular function of the controlled device. For example, and with reference to FIG. 4, controlled device 212 may receive electrical power through auxiliary device 402. In this example, auxiliary device 402 may be a smart power socket. Auxiliary device 402 may detect a power-on event represented by an increase in electrical power drawn by controlled device 212. Auxiliary device 402 may accordingly notify C&C device 404 that a user is attempting to access controlled device 212.

Auxiliary device 402 may take a variety of forms. As described above, auxiliary devices may control, provide, or otherwise facilitate various functions of controlled device 212. For example, an auxiliary device may include a power supply such as a smart power socket, a router that is capable of filtering network information, a television decoder box that is capable of blocking access to particular channels, specialized hardware modules that attach to and/or are incorporated into controlled devices in order to facilitate the enforcement of access-control policies, combinations of one or more of the same, and/or any other suitable device that is capable of controlling resources provided to controlled device 212 and/or content provided by controlled device 212.

Figure 4:
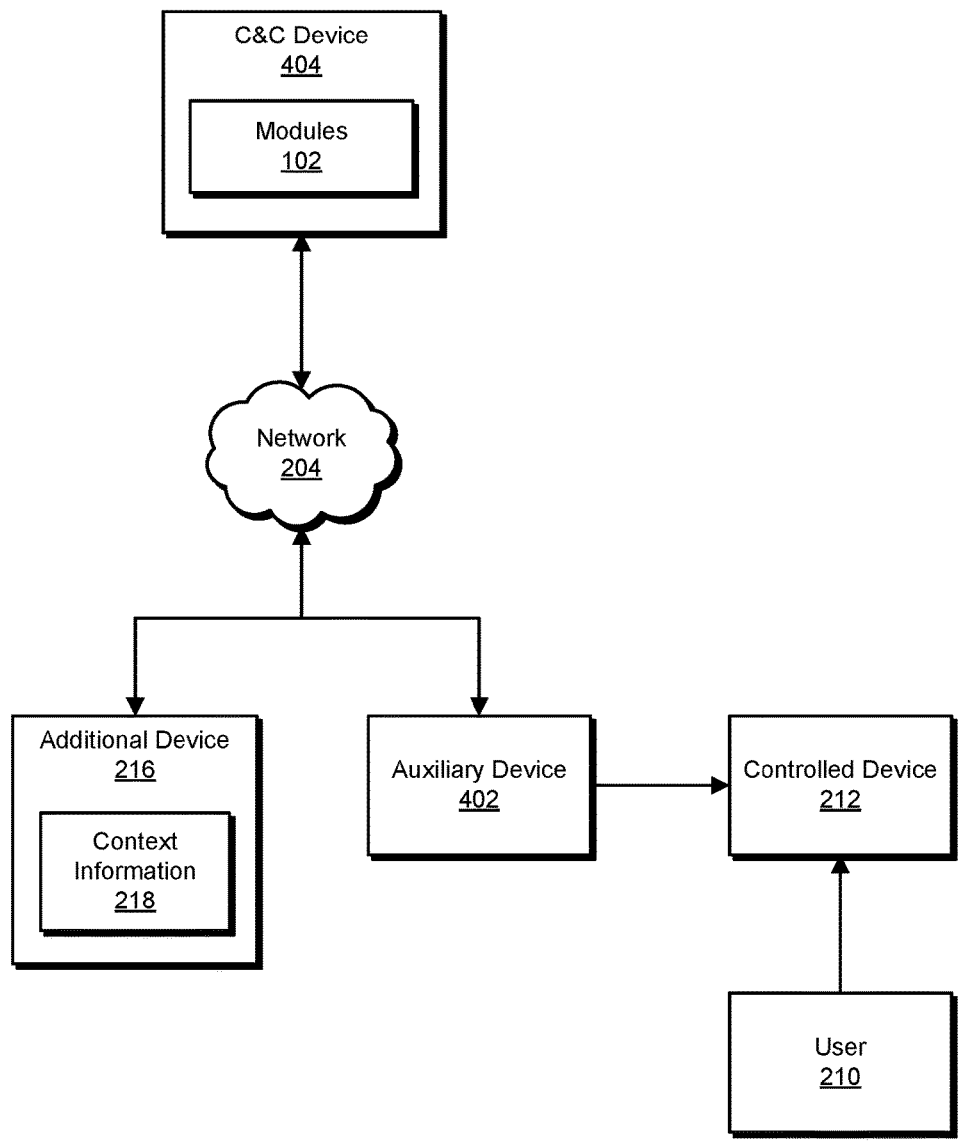
FIG. 4 is a block diagram of an additional example computing system for enforcing access-control policies.

An example system using an auxiliary device to facilitate control over controlled device 212 is illustrated in FIG. 4. As illustrated, user 210 may wish to access certain content through controlled device 212, which is connected to an auxiliary device 402. Controlled device 212 may be managed by a command-and-control device, illustrated as C&C device 404. In the example of FIG. 4, C&C device 404 executes some or all of modules 102 in a manner analogous to server 206 in FIG. 2. As will be described in greater detail below, C&C device 404 may instruct auxiliary device 402 to interrupt, filter, block, or otherwise manage content and/or resources provided to controlled device 212, such as power, network communications, etc. depending on the exact nature of auxiliary device 402.

Returning to FIG. 3 at step 304, one or more of the systems described herein may locate at least one additional device that is in physical proximity to the controlled device. For example, locating module 106 may, as part of server 206 in FIG. 2, locate at least one additional device 216 that is in physical proximity to controlled device 212.

Locating module 106 may first identify the physical location of controlled device 212. In some examples, locating module 106 may request physical location information from controlled device 212, such as GPS coordinates. Additionally or alternatively, locating module 106 may search a database of controlled devices for an entry corresponding to controlled device 212. This entry may contain physical location information relating to controlled device 212. For example, C&C device 404 in FIG. 4 may maintain a database of devices registered to C&C device 404 along with specific locations for each registered device. Furthermore, locating module 106 may identify a relative physical location of controlled device 212. For example, a database may contain information on which devices are present in particular rooms of a building. In such an example, locating module 106 may identify which particular room contains controlled device 212.

In further examples, locating module 106 may identify controlled device 212 via data received from various other devices. For example, a particular monitoring device may provide an image of a device within the monitoring device's field of view. Locating module 106 may use image recognition techniques to identify the device as controlled device 212, and thus extrapolate either an absolute (e.g., GPS coordinate) or relative (e.g., in proximity to another device or object and/or located in a particular room of a building) location of controlled device 212. As an additional example, locating module 106 may identify a Media Access Control (MAC) address of controlled device 212 and triangulate the position of controlled device 212 through wireless signal strengths received at a constellation of wireless access points.

Locating module 106 may locate additional device 216 in a variety of ways. As described in greater detail above, locating module 106 may determine the physical location of controlled device 212. Locating module 106 may then search for additional devices within physical proximity to controlled device 212. For example, locating module 106 may search a list of monitoring devices for devices located in physical proximity to controlled device 212. Additionally or alternatively, various additional devices may report their physical location to one or more of modules 102. Locating module 106 may use this reported location information to determine which additional devices are in proximity to controlled device 212 and thereby locate additional device 216.

In some embodiments, locating module 106 may use specialized mapping devices and software to identify relative locations of various devices. For example, a parent may survey the interior of their home using a MICROSOFT HOLOLENS. Locating module 106 may use the results of this survey to identify the physical locations of various controlled devices and/or additional devices within the home. Then, locating module 106 may, depending on the physical location of the controlled device identified by determination module 104, locate additional devices that are suitably located to observe user 210.

In some examples, additional device 216 may include a self-propelled device that is capable of relocating itself in physical space, such as a ROOMBA home cleaning device. In these examples, the self-propelled device may not originally be within physical proximity to controlled device 212. However, locating module 106 may direct such a self-propelled device to move into physical proximity of controlled device 212, and thus identify the self-propelled device as additional device 216. Some additional devices may not be completely self-propelled but nevertheless be capable of limited forms of movement. For example, a security camera may be able to swivel to change its field of view. Locating module 106 may determine that such a device is able to view user 210 and/or controlled device 212 from certain positions. Locating module 106 may accordingly instruct the limited-mobility additional device to reposition itself to view user 210 and/or controlled device 212.

Additionally or alternatively, locating module 106 may request that a user manually reposition and/or approach an additional device in order to allow the additional device to capture context information 218. For example, locating module 106 may request that user 210 reposition a webcam connected to a desktop computer so that the webcam can capture an image of the user's face for use as context information 218. Locating module 106 may accordingly identify such a repositioned device as additional device 216.

At step 306 in FIG. 3, one or more of the systems described herein may acquire context information from the additional device that provides information about the identity of the user. For example, acquiring module 108 may, as part of server 206 in FIG. 2, acquire context information 218 from additional device 216 that provides information about the identity of user 210.

Acquiring module 108 may acquire a variety of context information from additional device 216. In some examples, acquiring module 108 may acquire the context information by acquiring a photograph of the user, a video of the user, a recording of the user's voice, a series of keystrokes entered by the user on the controlled device, a Wi-Fi signal interference pattern of the user, and/or any other suitable information that may be used to determine the identity of the user.

In some embodiments, acquiring module 108 may also acquire content information that provides information about the content that user 210 is attempting to access through controlled device 212. For example, acquiring module 108 may acquire information that describes the content being accessed by user 210 through controlled device 212. In some examples, controlled device 212 may be equipped to directly provide this information to acquiring module 108. For example, an operating system of a computer may provide information such as a process name, a link to a website, or any other suitable information that identifies the content being accessed to acquiring module 108. As a specific example, a user such as a child may seek to access a games website on a personal computer. In this example, an operating system running on the computer may provide the URL of the games website to acquiring module 108.

In some situations, controlled device 212 may not be capable of directly providing information to modules 102. In such embodiments, the systems described herein may acquire the content information by observing a display of controlled device 212 via additional device 216. As an example, controlled device 212 may be an old-model television that does not have networking capabilities. User 210 may seek to access a particular television channel on the old-model television. In this example, additional device 216 may include a camera that is capable of capturing content displayed on the television and provide images of the screen of controlled device 212 to acquiring module 108.

Acquiring module 108 may acquire context and/or content information from more than one additional device. For example, a single additional device may be unable to simultaneously observe the user and controlled device. In such situations, acquiring module 108 may acquire information from more than one additional device, such as one device that is able to record content information describing content displayed by controlled device 212 and a second device that is able to provide context information that may be used to determine the identity of the user. Additionally or alternatively, acquiring module 108 may acquire information from multiple additional devices observing the same target. For example, acquiring module 108 may acquire a recording of a user's voice collected by the microphone of a smart phone in addition to a picture of the user's face as captured by a game system camera (e.g., MICROSOFT KINECT). Establishing module 110 may use any or all of this information to establish the identity of the user, as will be described in greater detail below.

As a specific example embodiment, acquiring module 108 may receive context and/or content information from a MICROSOFT HOLOLENS. In some variations of this embodiment, a user such as a parent, babysitter, or other supervisor may wear the HOLOLENS and observe users attempting to access controlled device 212. Acquiring module 108 may acquire this observation for use by other elements of modules 102, as will be described in greater detail below. In other variations of this embodiment, the HOLOLENS may be mounted on a bracket such that it is able to monitor users of controlled device 212 and/or observe a display of controlled device 212. Again, acquiring module 108 may acquire such monitoring and/or observation data from the HOLOLENS.

Figure 5:
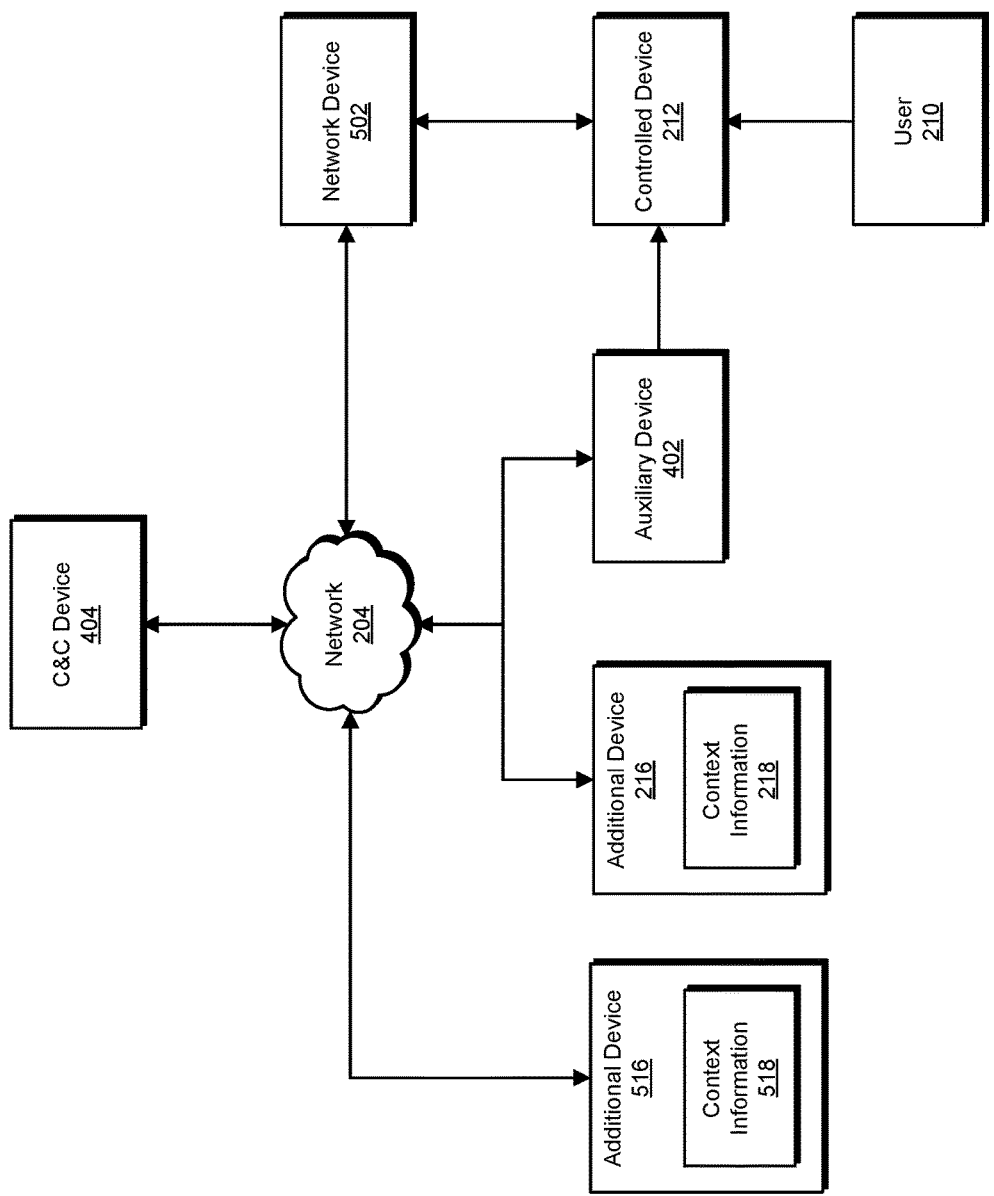
FIG. 5 is a block diagram of an example computing system for enforcing access-control policies using multiple additional devices.

FIG. 5 is an illustration of an example system for collecting context information through multiple additional devices. As shown in FIG. 5, user 210 may attempt to access certain features of controlled device 212, which is connected to a smart power supply (illustrated as auxiliary device 402) and a network device 502 that facilitates Internet access for controlled device 212. Furthermore, additional device 216 and additional device 516 may be present in physical proximity to controlled device 212. Additional devices 216 and 516, network device 502, and auxiliary device 402 may all be registered to C&C device 404 as capable of providing various forms of context information that describe the identity of user 210 and/or the content that user 210 is attempting to access. In this example, auxiliary device 402 may report a power-on event to C&C device 404 when user 210 turns on controlled device 212. C&C device 404 may then acquire context information 218 and 518 from additional devices 216 and 516, respectively. Additional device 216 may capture an image of user 210's face, while additional device 516 captures a sound recording of the user's voice. C&C device 404 may use this information to determine the identity of user 210, as explained in greater detail above. Network device 502 may then report that user 210 is attempting to access a particular website. C&C device 404 may instruct network device 502 and/or controlled device 212 to filter, block, or allow access to the website based on an access-control policy appropriate to user 210, as will be described in greater detail below.

Returning to FIG. 3 at step 308, one or more of the systems described herein may establish the identity of the user based on the context information acquired from the additional device. For example, establishing module 110 may, as part of server 206 in FIG. 2, establish the identity of user 210 based on context information 218 acquired from additional device 216.

Establishing module 110 establish the identity of user 210 in a variety of ways. In some embodiments, establishing module 110 may establish the identity of the user by matching the context information to a previously established user profile. For example, establishing module 110 may apply facial recognition methods to match an image of the face of user 210 to facial images stored in a database of known users. As an additional example, establishing module 110 may match the user's voice patterns to previously recorded voice profiles of known users.

In some situations, establishing module 110 may be unable to match the context information to a known user. For example, the context information may not match any entries in a user profile database. Alternatively, the systems and methods described herein may simply not maintain a database of known users. In these situations, establishing module 110 may nevertheless attempt to identify various attributes of the user. For example, establishing module 110 may establish the identity of the user by determining an approximate age of the user. Establishing module 110 may use a variety of information to determine the approximate age of the user, such as video or photographic information to determine the user's height and/or body frame, voice analysis heuristics, infrared imaging, and/or any other suitable method for determining the approximate age of the user.

In some embodiments, establishing module 110 may determine the position of user 210 relative to controlled device 212. For example, a particular user may not be in a position to access content delivered by controlled device 212 while another user is in a position that would suggest that they are able to access content through controlled device 212. As a specific example, a user seated at a computer is likely to access content through the computer while a user 5 feet away might be unable to directly access the computer from where they are standing. Similarly, a user seated within a certain viewing angle of a television would likely be able to observe content displayed by the television while a user seated behind the television would likely not access content through the television.

In some examples, establishing module 110 may determine that multiple users are attempting to access content displayed by controlled device 212. For example, a teenager and a toddler may be watching television, and the television may be subject to certain parental controls that restrict certain content from being displayed on the television when the toddler is present. In this example, establishing module 110 may determine, based on the context information acquired by acquiring module 108, that there are multiple users present within viewing range of the television and establish the identity of each user present.

At step 310 in FIG. 3, one or more of the systems described herein may enforce the access-control policy based on the identity of the user. For example, enforcing module 112 may, as part of server 206 in FIG. 2, enforce access-control policy 214 based on the identity of user 210.

Enforcing module 112 may enforce access-control policy 214 in a variety of contexts. In some examples, enforcing module 112 may execute as part of access-control software installed on controlled device 212. In such examples, enforcing module 112 may enforce access-control policy 214 by preventing software and/or components of controlled device 212 from accessing restricted content when controlled device 212 is being used by a user who should not access the restricted content. Additionally or alternatively, enforcing module 112 may execute as part of a device that enables controlled device 212 to access controlled content. For example, enforcing module 112 may execute as part of a router that enables a computer to access the Internet. In such an example, enforcing module 112 may prevent users of the computer from accessing restricted websites by blocking, at the router, access to those websites based on the identity of the user attempting to access the website.

In certain embodiments, enforcing module 112 may additionally or alternatively execute as part of a central command-and-control device that manages and enforces access-control policies on multiple controlled devices. Such a command-and-control device may utilize a variety of methods for enforcing access-control policies, including but not limited to software agents installed on the controlled devices, software installed on enabling devices (e.g., a router, as described above), specialized hardware (e.g., smart power plugs), combinations of one or more of the same, and/or any other suitable method for ensuring that users do not access restricted content. In these embodiments, the command-and-control device may enforce access-control policies on controlled device 212 by directing these auxiliary devices to filter content and/or control power to controlled device 212 as appropriate.

For example, and with reference to FIG. 5, C&C device 404 may, upon determining the identity of user 210 and/or identifying content being accessed by user 210 on controlled device 212, enforce an access-control policy for controlled device 212 that is appropriate to user 210. Enforcing module 112 may, as part of C&C device 404 in FIG. 5, direct network device 502 to filter or block network activity that is not authorized for user 210. Additionally or alternatively, C&C device may direct auxiliary device 402 to stop supplying power to controlled device 212, depending on the access-control policy actions that enforcing module 112 determines are appropriate for the situation.

Enforcing module 112 may enforce the access-control policy based on a variety of information. For example, establishing module 110 may have matched context information 218 to a previously established user profile. In such an example, enforcing module 112 may enforce an access-control policy that is associated with the previously established user profile. As a specific example, establishing module 110 may determine that a specific child is attempting to access controlled device 212 and enforce an access-control policy specific to that child.

Additionally or alternatively, establishing module 110 may be unable to match context information 218 to a specific user profile but nevertheless determined various attributes of user 210, such as an approximate age of user 210. In these examples, enforcing module 112 may enforce an access-control policy that is appropriate to the user information determined by establishing module 110. For example, establishing module 110 may determine that user 210 is an adult male whose features do not match a recorded user profile. Enforcing module 112 may accordingly allow or block various content based on an access-control policy appropriate to this general user profile.

In some examples, the systems and methods disclosed herein may perform a security action as part of enforcing the access-control policy. For example, enforcing module 112 may detect that access-control systems have been tampered with. As an additional example, enforcing module 112 may simply take steps to ensure that user 210 does not access inappropriate content. Additional examples of security actions include, without limitation, notifying a supervisor of the controlled device that the user attempted to access the controlled device, generating a log entry that describes the user's attempt to access the controlled device, restricting at least one function of the controlled device; disabling the controlled device, and/or any other suitable security action to be taken as part of enforcing appropriate access-control policies.

As described in greater detail above, the systems and methods described herein may utilize an array of devices to observe a user and/or a controlled device that is subject to an access-control policy. The systems and methods described herein may use this context information to establish the identity of the user and thereby enforce an access-control policy that is appropriate to that particular user. As such, the systems and methods may enable robust access-control enforcement, even for devices that may otherwise be unable to provide access-control functions and even in the face of clever users who may attempt to subvert traditional access-control systems.

Figure 6:
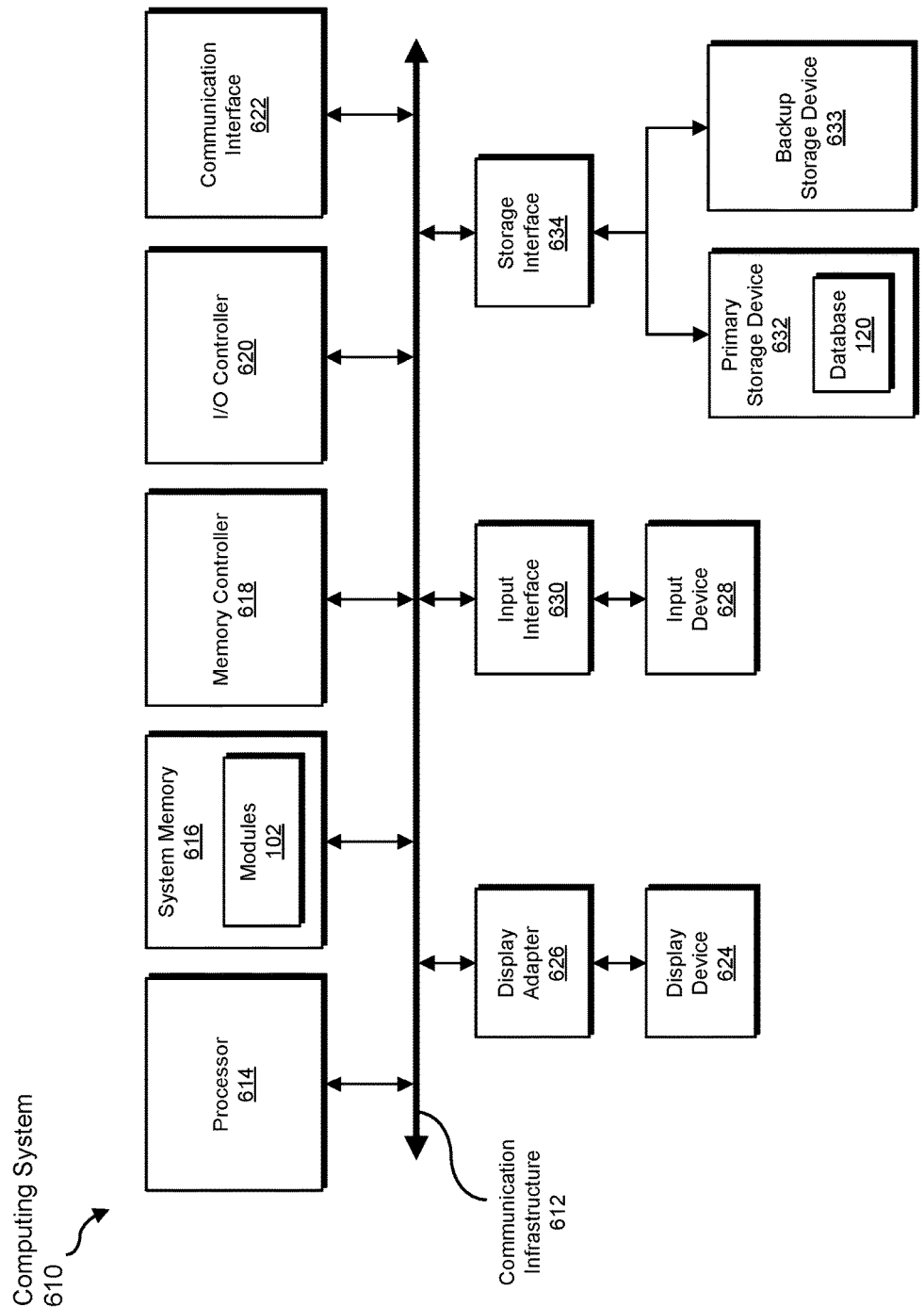
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, computing system 610 may also include at least one input device 628 coupled to communication infrastructure 612 via an input interface 630. Input device 628 generally represents any type or form of input device capable of providing input, either computer or human generated, to computing system 610. Examples of input device 628 include, without limitation, a keyboard, a pointing device, a speech recognition device, or any other input device.

As illustrated in FIG. 6, computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
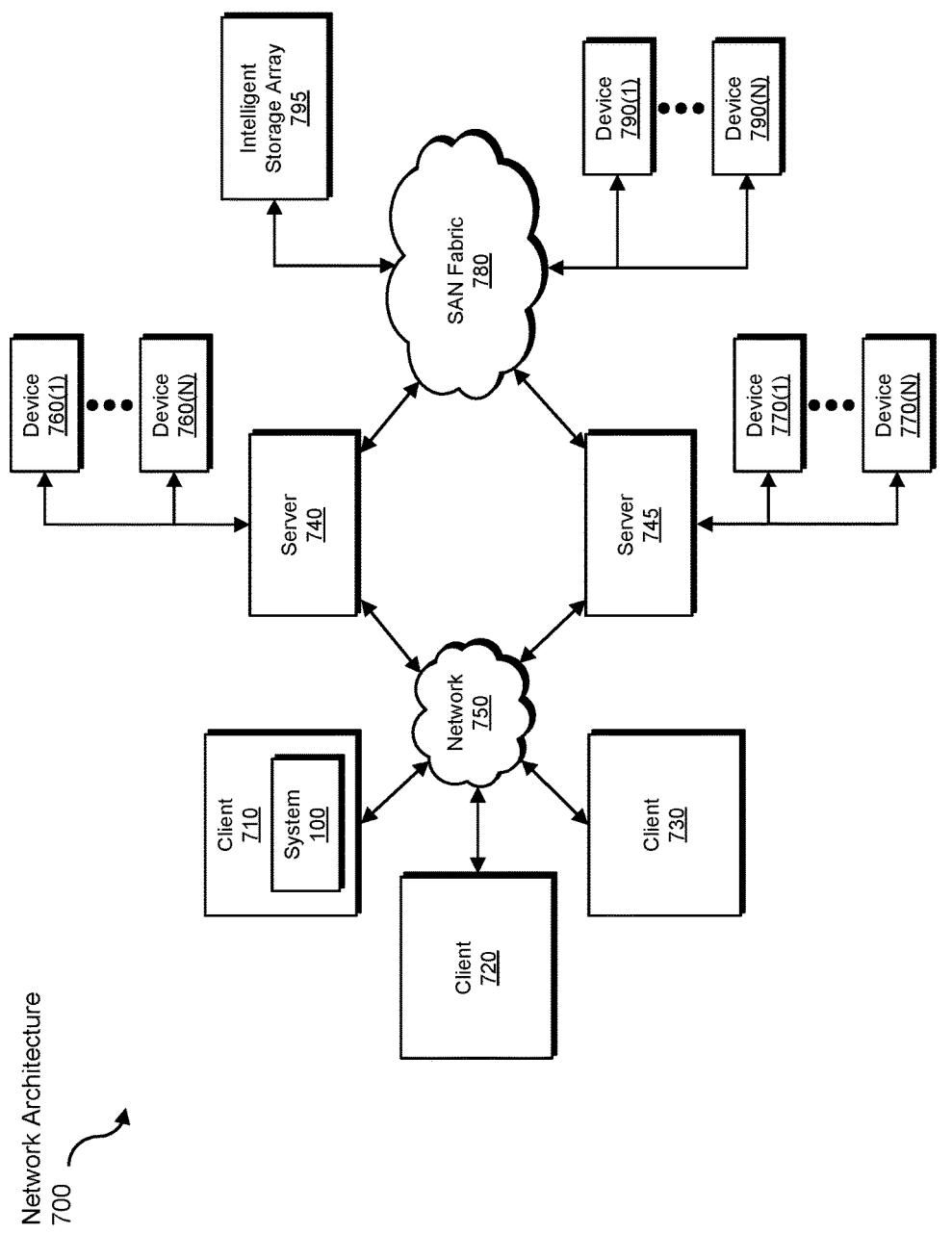
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enforcing access-control policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples in nature since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various methods described and/or illustrated herein may also omit one or more of the steps described or illustrated herein or include additional steps in addition to those disclosed.

While various embodiments have been described and/or illustrated herein in the context of fully functional computing systems, one or more of these embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the embodiments disclosed herein.

In addition, one or more of the modules described herein may transform data, physical devices, and/or representations of physical devices from one form to another. For example, one or more of the modules recited herein may receive context information to be transformed, transform the context information into an identity profile of a user that is attempting to access a controlled device, use a result of the transformation to enforce an access-control policy appropriate to the user on the controlled device, inform a software security system of a result of the transformation, generate an audit report based on a result of the transformation, and/or output a result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the embodiments disclosed herein. This description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing access-control policies, at least a portion of the method being performed by a computing device comprising at least one processor, the method comprising:
   determining, by an access control system executing on a command-and-control device that manages a controlled device that is subject to an access-control policy that describes circumstances under which differing users are permitted to access certain functions of the controlled device, that a user is attempting to access a restricted function of the controlled device;
   searching the physical area surrounding the controlled device for at least one additional device that is in physical proximity to the controlled device and is capable of acquiring context information about the identity of the user at least in part by:
      determining a physical location of the controlled device;
      determining a physical location of the at least one additional device; and
      determining that the physical location of the at least one additional device is in physical proximity to the physical location of the controlled device;
   acquiring context information from the additional device that provides information about the identity of the user;
   establishing the identity of the user based on the context information acquired from the additional device;
   recognizing content that the user is attempting to access via the controlled device based on information that includes a description of the content that the user is attempting to access; and
   providing the identity of the user to the access-control system, thereby enabling the access-control system to enforce the access-control policy based on the identity of the user and the content that the user is attempting to access via the controlled device.

2. The method of claim 1, wherein acquiring the context information comprises acquiring at least one of:
   a photograph of the user;
   a video of the user;
   a recording of the user's voice;
   a series of keystrokes entered by the user on the controlled device; and
   a Wi-Fi signal interference pattern of the user.

3. The method of claim 1, wherein the additional device comprises a self-propelled device that is capable of relocating itself in physical space.

4. The method of claim 1, wherein recognizing the content comprises observing a display of the controlled device via the additional device.

5. The method of claim 1, wherein the command-and-control device:
   monitors a plurality of controlled devices that comprises the controlled device; and
   enforces access-control policies for the plurality of controlled devices.

6. The method of claim 1, wherein establishing the identity of the user comprises matching the context information to a previously established user profile.

7. The method of claim 6, wherein enforcing the access-control policy comprises enforcing an access-control policy that is associated with the previously established user profile.

8. The method of claim 1, wherein establishing the identity of the user comprises determining an approximate age of the user.

9. The method of claim 1, wherein enforcing the access-control policy comprises performing a security action that comprises at least one of:
   notifying a supervisor of the controlled device that the user attempted to access the controlled device;
   generating a log entry that describes the user's attempt to access the controlled device;
   restricting at least one function of the controlled device; and
   disabling the controlled device.

10. A system for enforcing access-control policies, the system comprising:
   a determination module, stored in memory, that determines, by an access-control system executing on a command-and-control device that manages a controlled device that is subject to an access-control policy that describes circumstances under which differing users are permitted to access certain functions of the controlled device, that a user is attempting to access a restricted function of the controlled device;
   a locating module, stored in memory, that searches the physical area surrounding the controlled device for at least one additional device that is in physical proximity to the controlled device and is capable of acquiring context information about the identity of the user at least in part by:
      determining a physical location of the controlled device;
      determining a physical location of the at least one additional device; and
      determining that the physical location of the at least one additional device is in physical proximity to the physical location of the controlled device;
   an acquiring module, stored in memory, that acquires context information from the additional device that provides information about the identity of the user;
   an establishing module, stored in memory, that establishes the identity of the user based on the context information acquired from the additional device;
   a recognizing module, stored in memory, that recognizes content that the user is attempting to access via the controlled device based on information that includes a description of the content that the user is attempting to access;
   an enforcing module, stored in memory, that provides the identity of the user to the access-control system, thereby enabling the access-control system to enforce the access-control policy based on the identity of the user and the content that the user is attempting to access via the controlled device; and
   at least one physical processor configured to execute the determination module, the locating module, the acquiring module, the establishing module, the recognizing module and the enforcing module.

11. The system of claim 10, wherein the acquiring module acquires the context information by acquiring at least one of:
   a photograph of the user;
   a video of the user;
   a recording of the user's voice;
   a series of keystrokes entered by the user on the controlled device; and
   a Wi-Fi signal interference pattern of the user.

12. The system of claim 10, wherein the additional device comprises a self-propelled device that is capable of relocating itself in physical space.

13. The system of claim 10, wherein the recognizing module recognizes the content by observing a display of the controlled device via the additional device.

14. The system of claim 10, wherein the command-and-control device:
monitors a plurality of controlled devices that comprises the controlled device; and
enforces access-control policies for the plurality of controlled devices.

15. The system of claim 10, wherein the establishing module establishes the identity of the user by matching the context information to a previously established user profile.

16. The system of claim 15, wherein the enforcing module enforces the access-control policy by enforcing an access-control policy that is associated with the previously established user profile.

17. The system of claim 10, wherein the establishing module establishes the identity of the user by determining an approximate age of the user.

18. A non-transitory computer-readable medium comprising one or more computer-readable instructions that, when executed by at least one processor of a computing device, cause the computing device to:
determine, by an access-control system executing on a command-and-control device that manages a controlled device that is subject to an access-control policy that describes circumstances under which differing users are permitted to access certain functions of the controlled device, that a user is attempting to access a restricted function of the controlled device;
search the physical area surrounding the controlled device for at least one additional device that is in physical proximity to the controlled device and is capable of acquiring context information about the identity of the user at least in part by:
determining a physical location of the controlled device;
determining a physical location of the at least one additional device; and
determining that the physical location of the at least one additional device is in physical proximity to the physical location of the controlled device;
acquire context information from the additional device that provides information about the identity of the user;
establish the identity of the user based on the context information acquired from the additional device;
recognize content that the user is attempting to access via the controlled device based on information that includes a description of the content that the user is attempting to access; and
provide the identity of the user to the access-control system, thereby enabling the access-control system to enforce the access-control policy based on the identity of the user and the content that the user is attempting to access via the controlled device.

* * * * *